Jan. 14, 1947.　　　　　P. ORR ET AL　　　　　2,414,388
SYNCHRONIZER COUPLING
Filed May 24, 1943　　　　　2 Sheets-Sheet 2

Inventors:
Palmer Orr and
Carl J. Conkle
By: Edward C. Fritzbaugh
Atty.

Patented Jan. 14, 1947

2,414,388

UNITED STATES PATENT OFFICE 2,414,388

SYNCHRONIZER COUPLING

Palmer Orr and Carl J. Conkle, Muncie, Ind., assignors to Borg-Warner Corporation, Chicago, Ill., a corporation of Illinois Application May 24, 1943, Serial No. 488,185

13 Claims. (Cl. 188—69)

1

This invention relates to coupling devices and particularly to a control means therefor. For purposes of illustration the invention will be described with reference to a coupling of the self-shifting type, that is, one which is moved into or out of engagement in response to changes in the relative direction of torque.

In Patent No. 2,360,711 issued on October 17, 1944, to Palmer Orr, there is described a locking means for a self-shifting coupling, the locking means employing an interlock of the sliding bolt or bean type. The interlock is controlled by means of a collar which is slid axially to lock or unlock the coupling. Where weight requirements are stringent the sliding collar must necessarily be made as short axially as possible so that in certain installations its ratio of length to diameter is not great enough to prevent tilting of the collar and as a result the collar binds upon its supporting sleeve.

The principal object of this invention is to provide an improved locking device for a coupling of the type referred to which when operated does not create any binding forces.

Another object of this invention is to provide an improved control collar or ring for a locking device of the type referred to such that no binding forces are created regardless of the narrowness of the collar.

A more specific object of this invention is to provide a coupling device of the self-shifting type which is axially compact and hence light in weight so as to be suitable for aircraft purposes.

A still more specific object is to provide a self-shifting coupling device for a two-speed aircraft reduction gear of the complex planetary type wherein either one of two elements of the planetary gear may be held against rotation to provide two reduced speeds through the gearing.

These and other objects of the invention will become apparent from the following detailed description and the accompanying drawings wherein.

Figure 1:
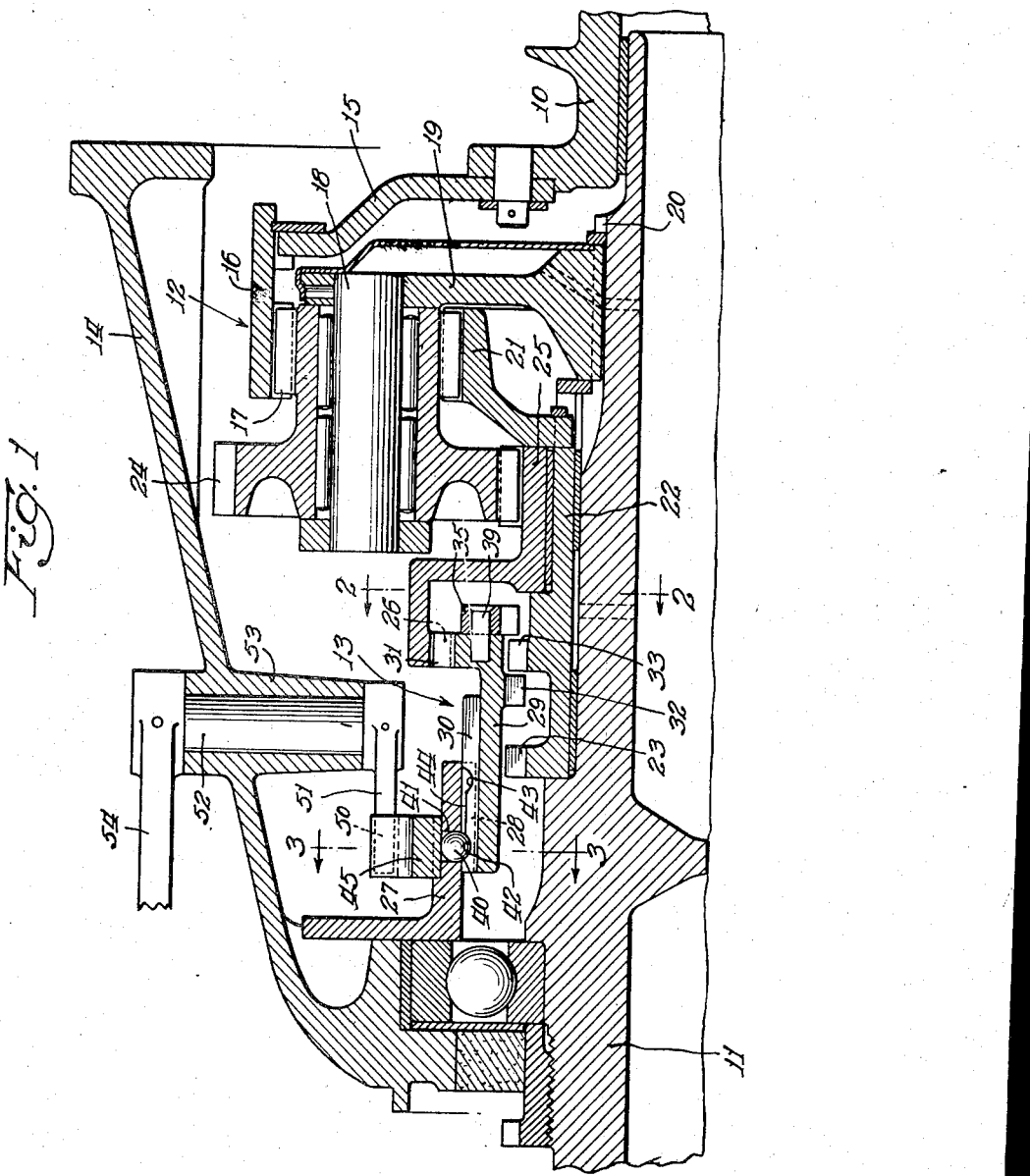
Fig. 1 is an elevation in section of a preferred embodiment of the invention.

Referring now to the drawings for a detailed description of the invention the transmission is comprised of a driving shaft 10 which may be directly connected to the engine or other source of power (not shown), a driven shaft 11 adapted to be connected to a propeller (not shown), a double reduction planetary gear set 12 adapted to provide two reduced drives between drive shaft 10 and driven shaft 11 and a coupling device 13 for effecting the changes in ratio through gear set 12. The entire mechanism is enclosed in a housing 14 which may be mounted between the propeller and engine.

The gearing is comprised of a drive plate 15 secured to drive shaft 10 and driving a ring gear 16. Said ring gear 16 meshes with and drives one or more planet pinion gears 17 which are the smaller of pairs of gears formed integrally as a spool and mounted to rotate about pinion shafts 18. A carrier 19 supports pinion shafts 18 and is mounted on and drives splines 20 in driven shaft 11. Planet pinions 17 mesh with a sun gear 21 drivingly associated with a sleeve 22 rotatably mounted on driven shaft 11 and having a coupling element 23 at the opposite end thereof.

The larger of the pairs of pinion gears is shown at 24 and these larger pinion gears mesh with a sun gear 25 rotatably supported on a sleeve 22, the sun gear 25 being provided with a coupling element 26 which is of enlarged diameter and of lesser axial extent than sleeve 22.

The coupling 13 is comprised of a plurality of elements including a stationary element 27 having internal helical splines 28, the aforementioned coupling element 23 associated with sun gear 21, the coupling element 26 associated with sun gear 25, and a sliding sleeve 29 appropriately formed to couple either element 23 or element 26 to stationary element 27, thereby arresting the rotation of either sun gear 21 or sun gear 25. Coupling element 23 is comprised of short straight splines or teeth, and coupling element 26 is comprised of similar short internal straight splines or teeth.

The lowest ratio is obtained by holding sun gear 21 and the next highest ratio is obtained by holding sun gear 25. In the form illustrated it is not contemplated that a direct drive between shafts 10 and 11 will be provided.

The coupling means by which either sun gear 21 or sun gear 25 is held against rotation will now be described.

Sleeve 29 is provided with external helical splines 30 which are adapted to engage the internal helical splines 28 on stationary element 27. Said sleeve 29 is enlarged adjacent splines 30 and is provided with external straight splines 31 thereat which are adapted to engage coupling element 26 on sun gear 25, the straight splines of element 26 being of about the same axial length as splines 31. Substantially mid-way between splines 30 and 31 and located within sleeve 29 are short straight internal splines 32 which are adapted to engage coupling element 23 on sun gear sleeve 22. Nested within the enlarged portion of sleeve 29 are additional straight splines 33 on sleeve 22 associated with sun gear 21.

Figure 2:
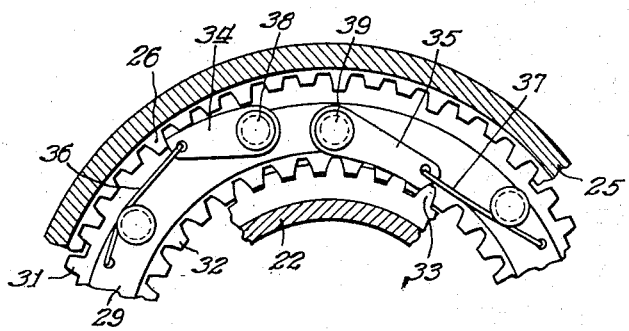
Fig. 2 is a fragmentary section taken on line 2—2 of Fig. 1.

Referring now to Fig. 2, it will be observed that every third tooth of the splines 26 is of normal size and the two intermediate teeth are of reduced height. Similarly, every third tooth of splines 33 is of normal height and the intermediate teeth are of reduced height. The purpose of this construction is to accommodate a pair of pawls 34 and 35, pawl 34 cooperating with splines 26 and pawl 35 cooperating with splines 33. A spring 36 normally biases pawl 34 into engagement with splines 26 and a similar spring 37 normally biases pawl 35 into engagement with splines 33. Pawl 34 is mounted on a pin 38 extending axially from the end of sleeve 29 and in like manner pawl 35 is mounted on a pin in the end of sleeve 39 which is also mounted in the end of sleeve 29. Since splines 28 and 30 which serve to couple sleeve 29 to fixed element 27 are helical, sleeve 29 will tend to move axially in response to changes in direction of torque impressed upon the sleeve 29. It will be observed from the arrangement of gearing shown in Fig. 1 that when sun gears 21 and 25 rotate they rotate in the same direction but sun gear 25 always rotates faster than sun gear 21 except in the brief instant during which a change in direction in rotation takes place. Sleeve 29, however, is relatively stationary since it swings through only a fraction of a circle in either direction. From these observations it will be apparent that when both sun gears rotate clockwise as viewed in Fig. 2, pawl 34 will be the driver and when the direction of rotation is counterclockwise as viewed in Fig. 2, pawl 35 will be the driver. When pawl 34 is the driver, sleeve 29 is advanced toward the right (Fig. 1) to engage external splines 31 with internal splines 26, thereby arresting the rotation of sun gear 25. In order that pawl 34 be the driver, however, it is necessary that the speed of drive shaft 10 drop below the speed of driven shaft 11, that is, it is necessary to close the throttle of the engine or in some other suitable fashion to apply a brake to drive shaft 10 while permitting driven shaft 11 to rotate at substantially the same speed. Since holding sun gear 25 provides the higher of the two ratios, that is, provides a lesser speed difference between the speeds of shafts 10 and 11, an upshift may be secured by the simple expedient of slowing down drive shaft 10.

To secure a downshift while keeping the speed of the driven shaft 11 substantially constant requires that the drive shaft 10 be accelerated. During such acceleration of the drive shaft 10 and, in fact, for as long as drive shaft 10 tends to drive driven shaft 11, sun gear 25 will rotate faster than sun gear 21 in a counterclockwise direction (Fig. 2) thereby causing pawl 35 to become the driver and to move sleeve 29 to the left as viewed in Fig. 1 so as to engage internal splines 32 on sleeve 29 with external splines 23 on sun gear sleeve 22. The pawls 34 and 35 are so related with respect to teeth 31 and 32 respectively, that said teeth are perfectly aligned with their mating splines when the pawls drive sleeve 29 in a direction to engage the teeth on the sleeve with the said splines.

The relative axial disposition of internal splines 32 and pawl 35 is such that when internal splines 32 of sleeve 29 are completely out of engagement with the external splines 23 on sleeve 22 as, for example, when sun gear 25 is stationary, pawl 35 is likewise completely out of engagement with splines 33. This is also true of pawl 34 when sun gear 21 is stationary and sun gear 25 is rotated. Both pawls completely leave their associated splines at the extreme ends of their axial travels. This avoids unnecessary noise and wear, the pawls being used merely to bridge the axial gap between splines 33 and 26 when splines 32 and 31 are completely disengaged from their associated sun gear splines.

Figure 3:
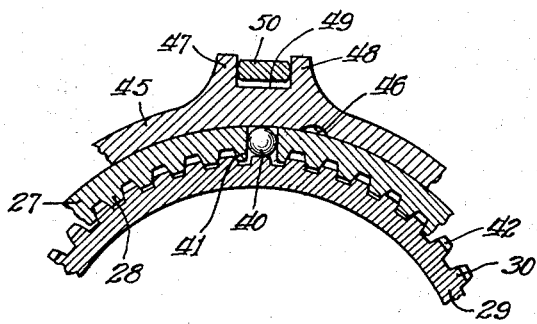
Fig. 3 is a fragmentary section taken on line 3—3 of Fig. 1.

Since sleeve 29 moves axially in response to torque variations, the transmission would continually shift between its two ratios unless some locking means were provided for the sleeve. This locking means is comprised of a bolt 40 shown in the form of a ball for purposes of illustration, the bolt being retained in a slot 41 in stationary element 27. Sleeve 29 is provided with spaced depressions or grooves 42 and 43 into which bolt 40 is adapted to move. The splines between the depressions 42 and 43 are relieved as shown at 44 to facilitate movement of the bolt between depressions. Referring now to Figs. 1 and 3, bolt 40 is retained in a depression by means of a ring 45 the effective peripheral length of which need not exceed six or seven diameters of bolt 40. Ring 45 is provided with a depression 46 into which bolt 40 may be cammed when sleeve 29 is moved from one of its extreme positions to the other. As long as depression 46 is not aligned with bolt 40, said bolt is locked in place, as is likewise sleeve 29, thereby rendering the transmission independent of changes in relative direction of torque transmission as between shafts 10 and 11. To permit a shift, however, ring 45 is oscillated so as to align depression 46 with bolt 40 and sleeve 29 then is freed to move as necessary, ring 45 being shifted so as to misalign depression 46 with bolt 40 after the shift of sleeve 29 has been completed.

To facilitate control of ring 45 two ears 47 and 48 are provided on ring 45 defining a slot 49 in which may be dropped the end 50 of a lever 51. Said lever 51 is mounted on a rock shaft 52 retained in a bearing 53 formed in housing 14. The outer end of shaft 52 is secured to a lever 54 which may be controlled in any suitable manner by the operator.

Since bolt 40 may be locked or unlocked merely by oscillation of ring 45 about its axis there is little tendency of the ring to bind on element 27 and hence a more dependable control for bolt 40 is provided by this invention.

Figure 4:
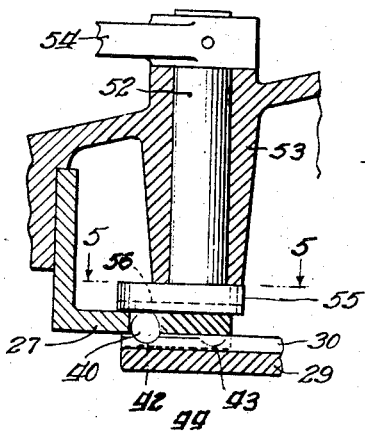
Fig. 4 is a fragmentary section of a modification of the invention.
Figure 5:
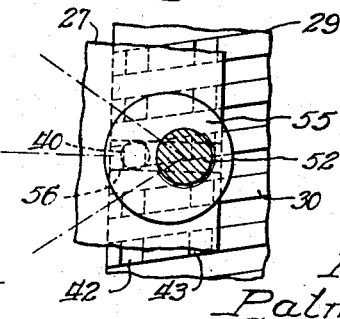
Fig. 5 is a plan view of the modification taken along line 5—5 of Fig. 4.

In the modification shown in Figs. 4 and 5, the ring 45 has been dispensed with entirely and rock shaft 52 has been moved toward the left of the housing shown in Fig. 1 and lever 51 has been shortened so as to approximate a circular plate 55. Said plate has a depression or groove 56 milled across the bottom face thereof which performs the same functions as depression 46 in ring 45. When shaft 52 is rocked, plate 55 rotates with it and groove 56 is moved from a position locking bolt 40 against sleeve 29, through a position permitting bolt 40 to move out of the way of sleeve 29 to a position again locking bolt 40 against sleeve 29. Due to the shorter arc through which the effective portion of groove 56 travels, the length of time during which bolt 40 is substantially aligned with groove 56 is increased, thus more nearly synchronizing the movement of the groove with the movement of sleeve 29.

The modification shown in Figs. 4 and 5 may be used where only one locking bolt is deemed sufficient. Where more than one locking bolt is found necessary, the oscillating ring of Figs. 1 to 3 inclusive should be used.

It is understood that the foregoing description is merely illustrative of preferred embodiments of the invention and that the scope of the invention therefore is not to be limited thereto but is to be determined by the appended claims.

We claim:

1. A coupling device for relatively rotatable elements comprising a pair of toothed members, a fixed member, and means for connecting the fixed member to either one of the toothed members, said means comprising a shiftable sleeve having an interfitting connection with the fixed member, a group of teeth engageable with one of the rotatable members, a second group of teeth engageable with the other rotatable member, said groups being mutually exclusively engageable, the interfitting connection being substantially spiraled such that the shiftable sleeve will be shifted in response to relative rotation between the fixed member and sleeve, locking means movable into the path of movement of the sleeve to lock the sleeve against such movement, and control means for the locking means, said control means comprising a ring mounted on the fixed member and cooperable with the locking means in one position to hold the locking means in said path of movement and in another position to permit the locking means to move out of said path.

2. A coupling device as described in claim 1, said ring having a depression which is aligned with the locking means when the ring is in its other position so as to receive the locking means when it moves out of the path of the sleeve.

3. A coupling device for connecting together relatively rotatable elements comprising a pair of toothed members each drivingly connected with one of said elements, one of said members being positioned within the other and the teeth of the members being opposed, a row of teeth on the inner member axially spaced from the opposed teeth, a third toothed member associated with another element, and means for connecting the third member to either one of the pair of toothed members, said means comprising a sleeve adapted to pass between the opposed teeth, a slidable connection between the sleeve and third member, rows of teeth on the sleeve adapted to engage said opposed teeth, additional teeth on the sleeve spaced from the said rows of teeth and adapted to engage the axially spaced row on the inner member when the teeth of the outer member are disengaged from the sleeve, and ratchet means mounted on the end of the sleeve and constantly engageable with the teeth on the outer member, said ratchet means serving to synchronize and position the teeth on the sleeve with respect to the teeth on the outer member.

4. A coupling device as described in claim 3, and additional ratchet means mounted on the said end of the sleeve and engageable with the opposed teeth on the inner member, said ratchet means serving to synchronize and position the teeth on the sleeve with respect to the teeth on the inner member.

5. A coupling device as described in claim 3, said slidable connection being substantially spiraled such that the sleeve is movable axially in response to relative rotation between the sleeve and third member, an opening in said third member, a bolt in said opening, spaced depressions in the sleeve adapted to receive the bolt when the sleeve is in a position to engage the teeth of either of the pair of toothed members, and means for locking the bolt in one or the other of the depressions thereby to lock the sleeve in engagement with one or the other of the pair of toothed members.

6. A coupling device for a plurality of members, one of which is rotatable relative to the other, said device including a coupling element adapted to be shifted in response to changes in relative direction of torque between two of the members, means for locking the element in a predetermined position comprising a bolt movable into the path of movement of the shiftable element to lock said element against rotation, a fixed support for the bolt, and control means for the locking means, said control means comprising a plate positioned over the bolt, a pivoted support for the plate, the pivotal axis of the support being disposed at an angle to the axis of the rotatable member, said plate having a depression in its surface adjacent the bolt to receive the bolt, thereby to permit said bolt to move out of the path of movement of the coupling element when the plate is rotated through a small angle about its pivoted support.

7. A coupling device for relatively rotatable elements comprising a pair of toothed members, a third toothed member, and means for connecting the third member to either one of the pair of members, said means comprising a shiftable element having an interfitting connection with the third member, a group of teeth engageable with one of the toothed members, a second group of teeth engageable with the other rotatable member, said groups being mutually exclusively engageable, and pawl and ratchet means effective between the shiftable member and the groups to effect a connection between the third member and one of the pair of members when synchronism therebetween is attained, said pawl and ratchet means being mounted at one end of the shiftable member.

8. A coupling device as described in claim 7, said pair of members being rotatable and said third member being fixed, whereby to arrest the rotation of either one of the pair of members.

9. A coupling device as described in claim 7, one of said toothed members having two rows of teeth, one of said rows being engageable solely by the pawl means.

10. A coupling device as described in claim 7, the interfitting connection with the third member being substantially spiraled such that the shiftable member will be shifted in response to relative rotation between the third member and shiftable member, and means movable into the path of movement of the shiftable member to lock the shiftable member against such movement.

11. A coupling device as described in claim 7, said pair of members being rotatable and said third member being fixed, whereby to arrest the rotation of either one of the pair of members, the interfitting connection with the third member being substantially spiraled such that the shiftable member will be shifted in response to relative rotation between the third member and shiftable member, and means movable into the path of movement of the shiftable member to lock the shiftable member in place.

12. A coupling as described in claim 7, the interfitting connection with the third member being substantially spiraled such that the shiftable member will be shifted in response to relative rotation between the third member and shiftable member, locking means movable into the path of movement of the shiftable member to lock the shiftable member against such movement, and control means oscillatable over the locking means from a position holding the locking means in the said path of movement, to a position permitting the locking means to move out of said path.

13. A coupling device for a pair of members, one of which is rotatable relative to the other, said device including a coupling element having a spiraled splined connection with one of said members, and thereby being shiftable in response to changes in relative direction of torque transmission between said two members, locking means movable into the path of movement of the shiftable element to lock said element against movement, and control means for the locking means, said control means comprising an abutment oscillatable over the locking means such that in one position the locking means is held in the path of movement of the shiftable element and in another position the locking means is permitted to move out of the said path of movement, said abutment comprising a ring coaxially disposed with respect to the members to be coupled and a lever for oscillating the ring.

PALMER ORR.
CARL J. CONKLE.